R. M. BROOKS.
Planter and Fertilizer.
No. 102,910.                    Patented May 10, 1870.
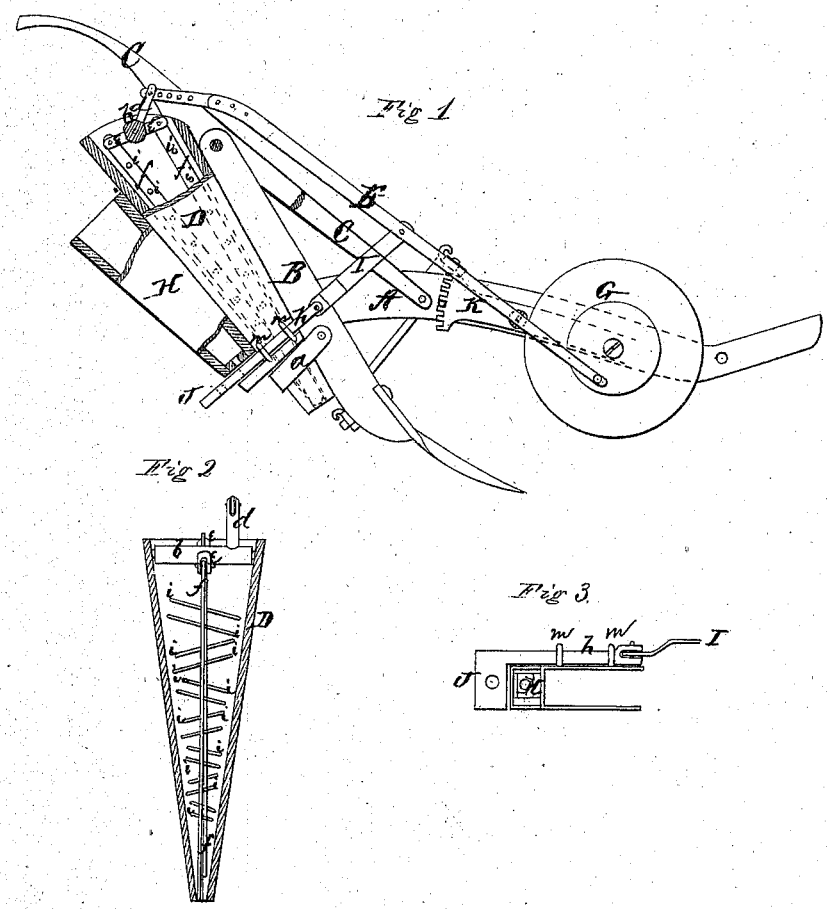

United States Patent Office.

RHODOM M. BROOKS, OF WOODBURY, GEORGIA.

Letters Patent No. 102,910, dated May 10, 1870.

---

IMPROVEMENT IN FERTILIZER-DISTRIBUTER, CORN AND COTTON-SEED PLANTER.

---

The Schedule referred to in these Letters Patent and making part of the same.

---

*To all whom it may concern:*

Be it known that I, RHODOM M. BROOKS, of Woodbury, in the county of Meriwether and in the State of Georgia, have invented certain new and useful Improvements in Combined Fertilizer-Distributer, Corn and Cotton-seed Planter; and do hereby declare that the following is a full, clear, and exact description thereof, reference being had to the accompanying drawings and to the letters of reference marked thereon making a part of this specification.

The nature of my invention consists in the construction and arrangement of a device to be attached to a plow for the purpose of distributing fertilizer, planting corn, cotton-seed, &c.

In order to enable others skilled in the art to which my invention appertains to make and use the same, I will now proceed to describe its construction and operation, referring to the annexed drawings, in which—

Figure 1 is a side elevation of a plow, with my device attached thereto;

Figure 2 is a longitudinal vertical section of the fertilizer or cotton-seed hopper; and Figure 3 is a bottom view of the corn-dropper attachment.

A represents the plow-beam;

B, the shank; and

C C, the handles of a plow constructed in any of the known and usual ways.

To the rear side of the shank B is attached a hopper, D, by means of a screw or bolt passing through the upper end of the shank, and into the hopper, while the lower end of the hopper is inserted into and held by a bent bar or loop, *a*, attached at a suitable point on the shank B.

The hopper D is square at top, and tapers gradually to a focus at the lower end, which is placed so as to be close to the ground.

In the upper end of the hopper D is a cross-shaft, *b*, having two arms, *e e*, extending in opposite directions.

Each of these bars is forked at its outer end, and a bar, *f*, pivoted to it, which bars *f f* extend downward through the hopper, and are provided with arms *i i*, in zigzag form, as shown in fig. 2.

These arms, of course, gradually diminish in length, to correspond with the tapering form of the hopper.

From the shaft *b* projects another forked arm, *d*, in the outer end of which is pivoted the upper curved end of a pitman, E, the lower end of the same being placed on a wrist-pin on the side of a gauge-wheel, G, which is attached to and adjusted on the side of the plow-beam A, as will be hereinafter fully set forth.

When the plow is in motion, the wheel G runs on the ground in advance of the plow, giving motion to the pitman E, and rocking the shaft *b*, causing the bars *f f* within the hopper D to move up and down alternately; that is, one moves up and the other down at the same time, thereby agitating the fertilizer, and pushing it out through the lower end of the hopper.

The length of the stroke of the bars *f f* is readily regulated by changing the pivot-point of the pitman E to the arm *d*, thereby also regulating the amount of fertilizer to be distributed at each stroke.

When it is desired to plant corn at the same time, then a corn-hopper, H, is attached to the rear side of the fertilizer-hopper D, and another pitman, I, attached to the pitman E at a suitable point, the pitman I being pivoted to an arm, *h*, extending from the corn-hopper slide J, and moving in guides *m m* on the side of the fertilizer-hopper D.

By this arrangement, the fertilizer is distributed and the corn planted at the same time, and all operated by the revolution of the wheel G.

When desired to plant cotton-seed, the corn-hopper H is of course dispensed with, and the hopper D alone used. In this case, I may attach another hopper, of similar construction to the hopper D, allowing one bar, *f*, to operate in each hopper.

The gauge-wheel G is pivoted to the front end of a bar, K, which, at or about its center, is pivoted to the plow-beam A, and its rear end enlarged and notched, as seen in fig. 1.

A pin is inserted into the beam A through one of these notches, to hold the wheel G in position.

By taking out the pin and turning the bar K on its pivot, the wheel G may be adjusted so as to gauge the plow to work deep or shallow, as desired; and, by inserting the pin again after setting the wheel, it is held firmly in its place.

Having thus fully described my invention,

What I claim as new, and desire to secure by Letters Patent, is—

1. The bars *f f*, provided with arms *i i*, and operating within the hopper D, alternately, in opposite directions, up and down, substantially as and for the purposes herein set forth.

2. In combination with a plow, the hopper D, with its alternately-operating bars *f f*, pitman E, wheel G, and bar K, all constructed and arranged to operate substantially in the manner and for the purposes herein set forth.

3. The arrangement of the hopper D and pitman E with the corn-hopper H, slide J, arm *h*, and pitman I, all substantially as and for the purposes herein set forth.

In testimony that I claim the foregoing, I have hereunto set my hand this 18th day of March, 1870.

RHODOM M. BROOKS.

Witnesses:
 A. N. MARR,
 C. L. EVERT.